(12) United States Patent
Chen

(10) Patent No.: US 10,499,035 B2
(45) Date of Patent: Dec. 3, 2019

(54) METHOD AND SYSTEM OF DISPLAYING A POPPING-SCREEN

(71) Applicant: Shanghai Hode Information Technology Co., Ltd., Shanghai (CN)

(72) Inventor: Hui Chen, Shanghai (CN)

(73) Assignee: Shanghai Hode Information Technology Co., Ltd., Shanghai (CN)

(*) Notice: Subject to any disclaimer, the term of this patent is extended or adjusted under 35 U.S.C. 154(b) by 234 days.

(21) Appl. No.: 15/684,544

(22) Filed: Aug. 23, 2017

(65) Prior Publication Data

US 2018/0063501 A1    Mar. 1, 2018

(30) Foreign Application Priority Data

Aug. 23, 2016 (CN) .......................... 2016 1 0710938

(51) Int. Cl.

| H04N 13/183 | (2018.01) |
| H04N 13/111 | (2018.01) |
| H04N 21/218 | (2011.01) |
| H04N 21/239 | (2011.01) |
| H04N 21/44 | (2011.01) |
| H04N 21/4788 | (2011.01) |
| H04N 21/488 | (2011.01) |
| H04N 21/81 | (2011.01) |

(52) U.S. Cl.
CPC ......... *H04N 13/183* (2018.05); *H04N 13/111* (2018.05); *H04N 21/21805* (2013.01); *H04N 21/2393* (2013.01); *H04N 21/44012* (2013.01); *H04N 21/4788* (2013.01); *H04N 21/4884* (2013.01); *H04N 21/816* (2013.01); *H04N 21/8146* (2013.01)

(58) Field of Classification Search
None
See application file for complete search history.

(56) References Cited

U.S. PATENT DOCUMENTS

| 7,809,773 B2 | 10/2010 | Horowitz et al. |
| 8,019,815 B2 | 9/2011 | Keener et al. |
| 8,376,910 B2 | 2/2013 | Cheung et al. |

(Continued)

FOREIGN PATENT DOCUMENTS

| CN | 103035024 A | 4/2013 |
| CN | 105072504 A | 11/2015 |

(Continued)

*Primary Examiner* — Lindsay J Uhl
(74) *Attorney, Agent, or Firm* — BakerHostetler

(57) ABSTRACT

Techniques for displaying popping-screen comment information in a virtual reality environment are described herein. The disclosed techniques include retrieving popping-screen comment information associated with a video in response to a request for displaying the popping-screen comment information while playing the video; acquiring a corresponding type of 3D spatial scene template in response to a request for a display type; integrating the popping-screen comment information into the first corresponding type of 3D spatial scene template and the video; and displaying the comment information in a virtual reality environment by combining the popping-screen information with a picture captured by a primary-viewing-angle virtual camera, a plurality of pictures captured by a plurality of auxiliary-site virtual cameras, and a scene chartlet.

20 Claims, 5 Drawing Sheets

(56) References Cited

U.S. PATENT DOCUMENTS

| | | |
|---|---|---|
| 8,545,369 B2 | 10/2013 | Cheung et al. |
| 8,555,177 B1 | 10/2013 | Junee et al. |
| 8,628,414 B2 | 1/2014 | Walker et al. |
| 8,701,153 B2 | 4/2014 | Abrams |
| 9,003,306 B2 | 4/2015 | Mehin et al. |
| 9,253,225 B1 | 2/2016 | Junee et al. |
| 9,332,315 B2 | 5/2016 | Agrawal |
| 9,467,408 B1 | 10/2016 | Sherman-Presser et al. |
| 2009/0249223 A1 | 10/2009 | Barsook et al. |
| 2012/0331496 A1 | 12/2012 | Copertino et al. |
| 2013/0326352 A1 | 12/2013 | Morton |
| 2014/0012910 A1 | 1/2014 | White |
| 2014/0013200 A1 | 1/2014 | White |
| 2014/0081435 A1 | 3/2014 | Wagner |
| 2014/0089801 A1 | 3/2014 | Agrawal |
| 2014/0092127 A1 | 4/2014 | Kruglick |
| 2015/0082342 A1 | 3/2015 | Norwood et al. |
| 2015/0261853 A1 | 9/2015 | Shao |
| 2016/0277328 A1* | 9/2016 | Ishizuka ................ G06F 13/00 |
| 2016/0316272 A1 | 10/2016 | Li |
| 2016/0342287 A1 | 11/2016 | Barker et al. |
| 2017/0225077 A1* | 8/2017 | Kim ..................... A63F 13/525 |
| 2018/0025751 A1* | 1/2018 | Patel ................... G11B 27/036 |
| | | 715/723 |

FOREIGN PATENT DOCUMENTS

| | | | |
|---|---|---|---|
| CN | 105100927 A | | 11/2015 |
| CN | 105847718 A | | 8/2016 |
| CN | 105847718 B | * | 10/2018 |

\* cited by examiner

METHOD AND SYSTEM OF DISPLAYING A POPPING-SCREEN

CROSS-REFERENCE TO RELATED APPLICATION

The present application is based on and claims priority of Chinese patent application No. 201610710938.1, filed on Aug. 23, 2016. The entire disclosure of the above-identified application is hereby incorporated by reference herein and made a part of this specification.

FIELD OF THE INVENTION

The present invention relates to the field of popping-screen display technology, and more particularly to a method and system of displaying a popping-screen.

BACKGROUND OF THE INVENTION

A popping-screen (sometimes referred to as "bullet screen") refers to a screen that contains a comment presented in the form of subtitle and that is shown simultaneously with a video screen in a same panel when watching a video shown in this panel. A lot of comments drifting over the video screen like intensive bullets, and thus are called popping-screens. The popping-screens appear over the video screen in real time as the video is playing, so that a viewer can see many popping-screens sent from other viewers and himself while watching the video.

In the process of broadcasting a network video, a server can obtain many popping-screen messages from a terminal, and then those popping-screen published from respective users for the network video are added to the network video in different timings for display. In such a way, users can easily read the comments published by respective users when they are browsing the network video.

The scene applied for the popping-screen in current technology only has one type, and thus cannot meet the needs of diversification.

SUMMARY OF THE INVENTION

It is an object of the present invention to provide a method and system of displaying a popping-screen which enables a user to obtain a new multi-dimensional popping-screen viewing experience in a virtual reality scene to meet the user's need for display diversity.

In order to achieve the above object, the present invention is achieved by a method of displaying a popping-screen, which is characterized in that it is applied to a system for displaying a popping-screen and that the system comprises a client terminal and a server in communication connection, an application tool having a virtual reality play function is installed in the client terminal, and the server is used in conjunction with the application tool having the virtual reality play function, the method of displaying a popping-screen comprising the steps of: S1, receiving a request for a popping-screen display and a request for a popping-screen display type inputted by the user, by means of an application tool of the virtual reality play function provided in the client terminal, during a process of playing a virtual reality video; S2, retrieving a user comment associated with the virtual reality video from said server based on said request for the popping-screen display; S3, acquiring a corresponding 3D spatial scene template from said server according to a request for the popping-screen display type; and S4, integrating and outputting, in combination, the user comment by a form of a popping-screen, the virtual reality video, and the 3D spatial scene template.

The server stores a plurality of different types of 3D spatial scene templates, and the step of generating the plurality of different types of 3D spatial scene templates comprises: obtaining a 3D spatial scene by means of a 3D rendering technology; obtaining a scene chartlet by charting a 3D material texture into the scene model; arranging the scene chartlet according to the spatial layout of the scene setting light source data of the environment for a scene corresponding to the scene model according to a time list of the scene model; creating a primary-view-angle virtual camera and a plurality of auxiliary-site virtual cameras, and determining the coordinate position of the primary-view-angle virtual camera and the plurality of auxiliary-site virtual cameras in the scene according to the position of the scene chartlet and the position of a final popping-screen display; repeating the above steps to get a number of different types of 3D spatial scene templates.

The scene model includes a scene object and a scene entity. The time list of the scene model includes an appearing timing and an ending timing of the scene object or the scene entity in the virtual reality video. The light source data of the environment for a scene includes the position coordinates, the color, the intensity and the direction of the light source.

The method further includes the steps of: restoring the obtained 3D spatial scene template, loading the retrieved user comments to the position of a final popping-screen display based on the timeline of the popping-screen, and synchronizing associated popping-screen data to output a picture captured by the primary-viewing-angle virtual camera, pictures captured by the plurality of auxiliary-site virtual cameras, the associated popping-screen data, and the scene chartlet in combination.

The client terminal receives the request of the user to replace the popping-screen display type, the server responds to the request and switches to the corresponding type of 3D spatial scene template, and the client obtains the corresponding 3D spatial scene template to be displayed.

A system of displaying a popping-screen is also disclosed, being characterized by comprising a server and a client terminal in a communication connection. A server computing system of displaying popping-screen comment information in a virtual reality environment comprises a template creating unit for generating a plurality of different types of 3D spatial scene templates according to a 3D rendering techniques; a template storage unit connected to said template creating unit for storing a plurality of different types of 3D spatial scene templates generated by said template creating unit; a mode switching unit connected to said template storage unit for implementing a switch between a plurality of different types of 3D spatial scene templates; a popping-screen storage unit for sequentially storing user comments sent by different client terminals in accordance with the timeline of the popping-screen; and a request responding unit connected to said mode switching unit and the popping-screen storage unit, respectively, for receiving a request for a popping-screen display that is input by a user and sent from a client terminal and a request for a popping-screen display type; wherein the client terminal is provided with an application tool having a virtual reality play function, said server is used in conjunction with the application tool having a virtual reality play function.

The client terminal further comprises: a display request unit connected to the request responding unit for receiving a request for a popping-screen display input by the user and acquiring user comments sent by a different client terminal and stored in the popping-screen storage unit; a type request unit connected to the request response unit for receiving a request for a popping-screen display type input by the user and acquiring a 3D space scene template corresponding to the type of the popping-screen display input by the user; a scene restoring unit connected to the type request unit for restoring the acquired 3D spatial scene template; a popping-screen loading unit connected to the display request unit for displaying the obtained user comments in the form of a popping-screen at the position where the final popping-screen is displayed in accordance with a timeline sequence of the popping-screen; and a combination output unit 205 connected to the scene restoring unit 203 and the popping-screen uploading unit 204 respectively for outputting the popping-screen, the virtual reality video, and the 3D spatial scene template in combination.

The template creating unit comprises a scene providing sub-unit for realizing a 3D spatial scene using a 3D rendering technique; a scene chartlet sub-unit for charting a 3D material texture into a scene model; a virtual camera creating sub-unit for creating a primary-viewing-angle virtual camera and a plurality of auxiliary-site virtual cameras; and a scene decorating sub-unit connected with the scene providing sub-unit, the scene charting sub-unit, the virtual camera creating sub-unit and the template storage unit respectively, for placing the scene chartlet according to the spatial layout of the scene, for setting the light source data of the scene environment corresponding to the scene model according to the time list of the scene model, and for determining the coordinate positions of the primary-viewing-angle virtual camera and the plurality of auxiliary-site virtual cameras in accordance with the position of the scene model and the position of a final popping-screen display.

The scene model comprises a scene object and a scene entity. The time list of the scene model comprises an appearing timing and an ending timing of the scene object or scene entity in the virtual reality video. The light source data of the environment for a scene comprises the position, coordinates, the color, the intensity and the direction of the light source.

The method and system of displaying a popping-screen in accordance with the present invention has the following advantages over the prior art: enabling a user to obtain a new multi-dimensional popping-screen viewing experience in a virtual reality scene, so as to satisfy the user's diversified demands and to provide an accurate and fast reading of comments for the video contents.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF THE INVENTION

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

The invention will now be described in further detail with reference to the accompanying drawings, in which a preferred embodiment is set forth in detail.

Figure 1:
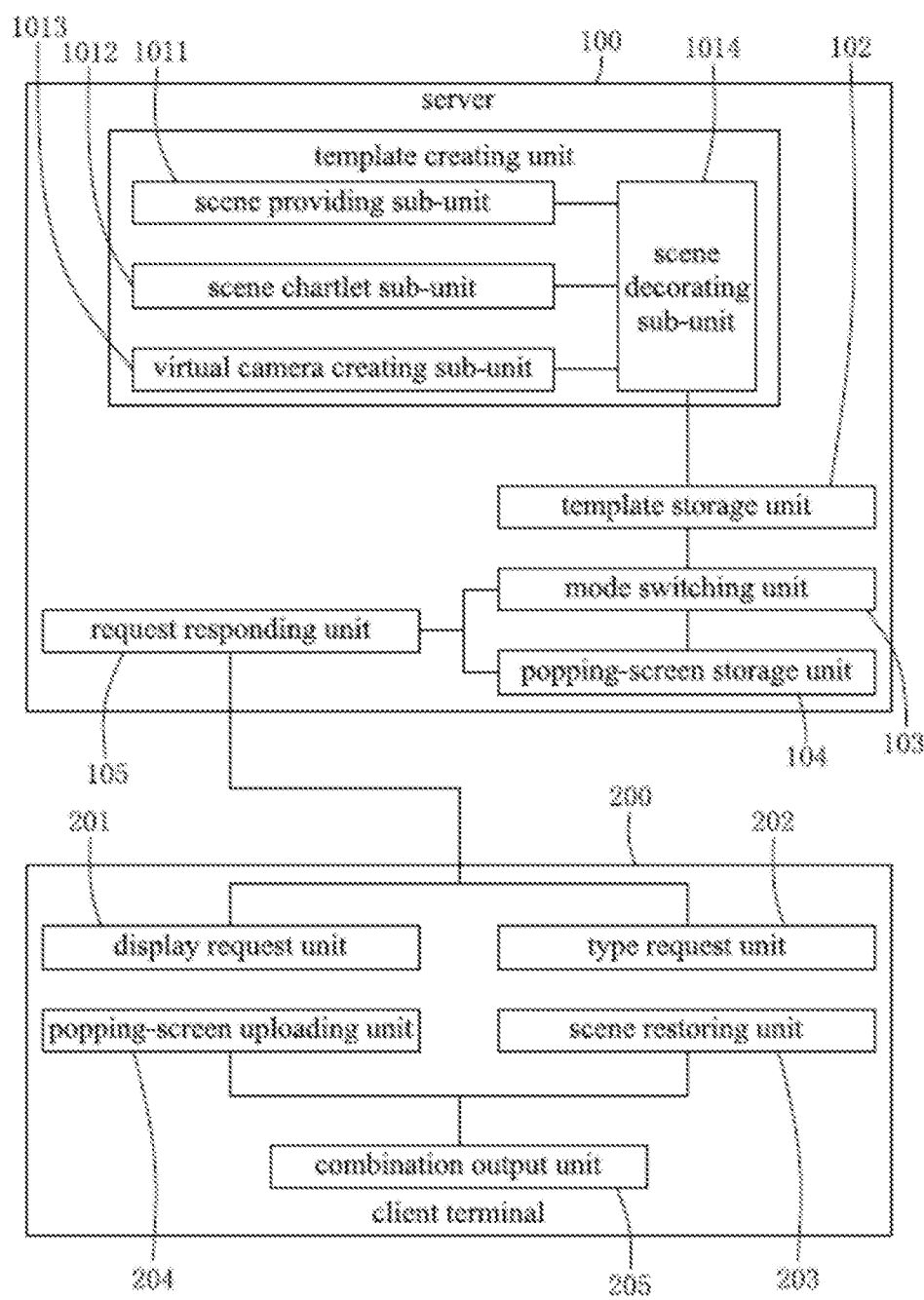
FIG. 1 is a structural block diagram of a popping-screen system disclosed in the present invention.
Figure 2:
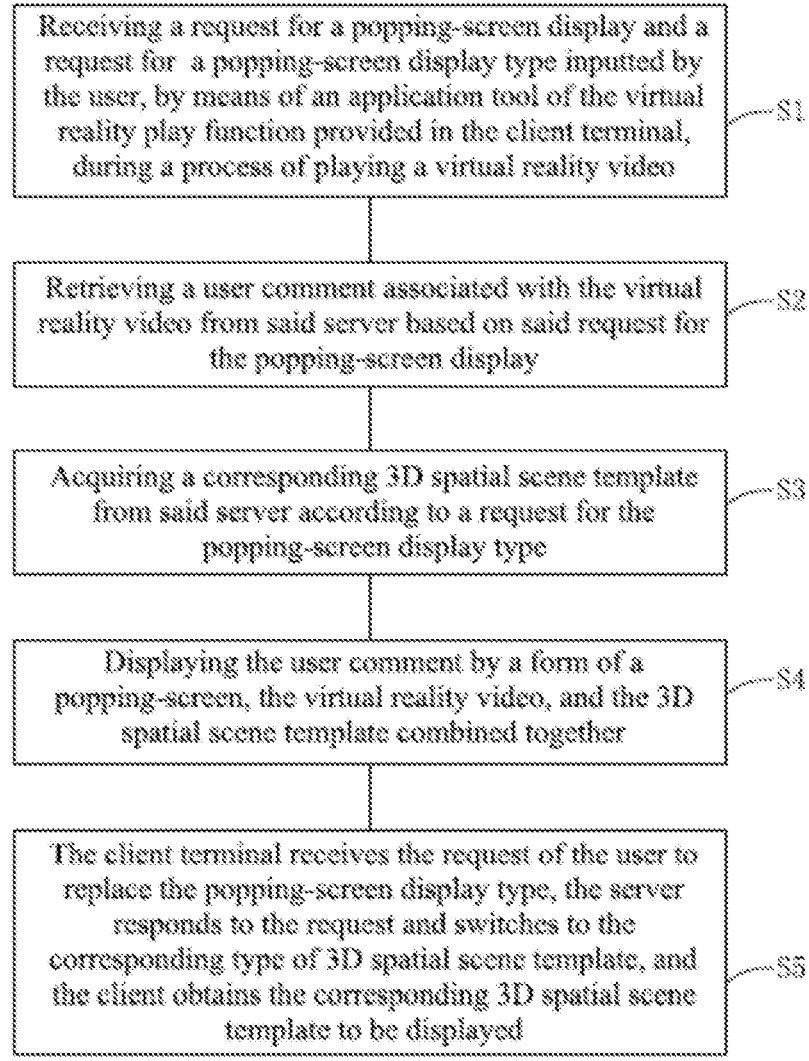
FIG. 2 is a flow chart of a method of displaying a popping-screen according to the present invention.

As shown in FIG. 1, a system of displaying a popping-screen comprises a server 100 and a client terminal 200, which are communicatively connected. The server 100 includes a template creating unit 101 for generating a plurality of different types of 3D spatial scene templates based upon a rendering technology; a template storage unit 102 connected to the template creating unit 101 for storing a plurality of different types of 3D spatial scene templates generated by the template creating unit 101; a mode switching unit 103 connected to the template storage unit 102 for implementing a switch between the plurality of different types of 3D spatial scene templates; a popping-screen storage unit 104 for sequentially storing user comments sent by different client terminals in accordance with the timeline of the popping-screen; a request responding unit 105 connected to the mode switching unit 103 and the popping-screen storage unit 104 for receiving a request for a popping-screen display and a request for a popping-screen display type that is inputted by a user and transmitted from the client terminal 200. The client terminal 200 is provided with an application tool having a virtual reality play function. The server 100 is used in conjunction with the application tool having a virtual reality play function.

The client terminal 200 further comprises a display request unit 201 connected to the request responding unit 105 for receiving a request for a popping-screen display inputted by a user and acquiring a user comment that is sent by a different client terminal and stored in the popping-screen storage unit 104; a type request unit 202 connected with the request responding unit 105 for receiving a request for a popping-screen display type input by the user and acquiring a 3D spatial scene template corresponding to the popping-screen display type input by the user; a scene restoring unit 203 connected to the type request unit 202 for restoring the acquired 3D spatial scene template; a popping-screen uploading unit 204 connected to the display request unit 201 for displaying the acquired user comments in the form of a popping-screen at a position of a final popping-screen display according to a timeline sequence of the popping-screen; and a combination output unit 205 connected to the scene restoring unit 203 and the popping-screen uploading unit 204 respectively for outputting the popping-screen, the virtual reality video, and the 3D spatial scene template in combination.

In a practical application, the client terminal in the present invention may include a device capable of playing a virtual reality video, such as a smartphone, a tablet PC, a desktop computer, a notebook, and VR device.

The application tool of the virtual reality play function in the present invention is software having the virtual reality play function. It can include a video application tool or a game application tool from the viewpoint of the file format and from the viewpoint of the applied scenario. The application tool of the virtual reality play function may include the application tool (APP) on the mobile phone, and the application tool in website. More specifically, it may include the website video application tool, the mobile video application tool, the website game application tool and the mobile game application tool.

In the present embodiment, it is preferable that the template creating unit 101 includes a scene providing sub-unit 1011 for realizing a 3D spatial scene using a 3D rendering technique; a scene chartlet sub-unit 1012 for charting a 3D material texture into a scene model; a virtual camera creating sub-unit 1013 for creating a primary-viewing-angle virtual camera and a plurality of auxiliary-site virtual cameras; and a scene decorating sub-unit 1014 connected with the scene providing sub-unit 1011, the scene charting sub-unit 1012, the virtual camera creating sub-unit 1013 and the template storage unit 102 respectively, for placing the scene chartlet according to the spatial layout of the scene, setting the light source data of the scene environment corresponding to the scene model according to the time list of the scene model, and determining the coordinate positions of the primary-viewing-angle virtual camera and the plurality of auxiliary-site virtual cameras in accordance with the position of the scene model and the final position of a popping-screen display.

In connection with the above-described system for displaying a popping-screen, the present invention also discloses a method of displaying a popping-screen, comprising the steps of: S1, receiving a request for a popping-screen display and a request for a popping-screen display type inputted by the user, by means of an application tool of the virtual reality play function provided in the client terminal, during a process of playing a virtual reality video; S2, retrieving a user comment associated with the virtual reality video from said server based on said request for the popping-screen display; and S3, acquiring a corresponding 3D spatial scene template from said server according to a request for the popping-screen display type.

The server stores a plurality of different types of 3D spatial scene templates. The step of generating the plurality of different types of 3D spatial scene templates comprises: obtaining a 3D spatial scene by means of a 3D rendering technology; obtaining a scene chartlet by charting a 3D material texture into the scene model; placing the scene chartlet according to the spatial layout of the scene; setting light source data of the environment for a scene corresponding to the scene model according to a time list of the scene model; creating a primary-view-angle virtual camera and a plurality of auxiliary-site virtual cameras, and determining the coordinate position of the primary-view-angle virtual camera and the plurality of auxiliary-site virtual cameras in the scene according to the position of the scene chartlet and the position of a final popping-screen display; and repeating the above steps to get a number of different types of 3D spatial scene templates.

The scene model includes a scene object and a scene entity. The time list of the scene model includes an appearing timing and an ending timing of the scene object or the scene entity in the virtual reality video. The light source data of the environment for a scene includes the position coordinates, the color, the intensity and the direction of the light source.

S4 is further included which outputs, in combination, the user comment in a form of a popping-screen, the virtual reality video, and the 3D spatial scene template.

Specifically, the acquired 3D spatial scene template is restored and the acquired user comments are uploaded to the position of a final popping-screen display according to the timeline of the popping-screen. The associated popping-screen data is synchronized, and a picture captured by the primary-viewing-angle virtual camera, pictures captured by the plurality of auxiliary-site virtual cameras, the associated popping-screen data, and the scene chartlet are output as well in combination.

S5 is further included in which the client terminal receives a request of the user to replace the popping-screen display type, the server responds to the request, and switches to a corresponding type of 3D spatial scene template, and the client terminal obtains the corresponding 3D spatial scene template to be displayed.

A user is free to select a viewing angle when he enters into a scene and under a status of primary-viewing-angle. Scene effects, real-time comments and popping-screen watching are combined together so that the user can get a deeply attracted experience of live show and virtual reality.

Figure 3:
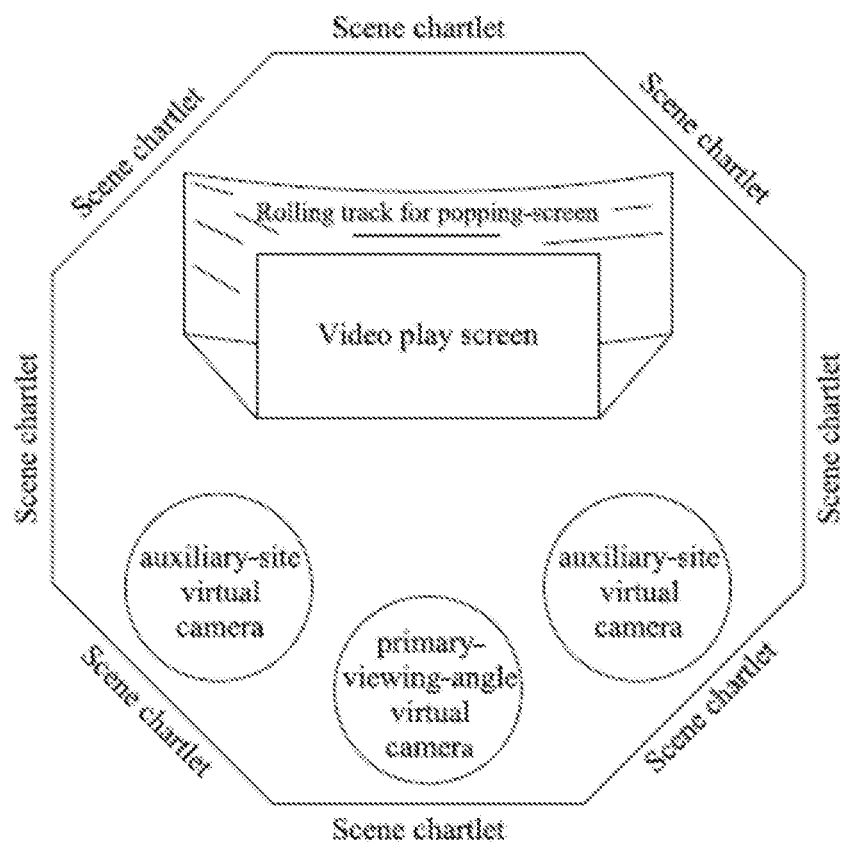
FIG. 3 is a diagram showing the effect according to a first embodiment of the present invention.
Figure 4:
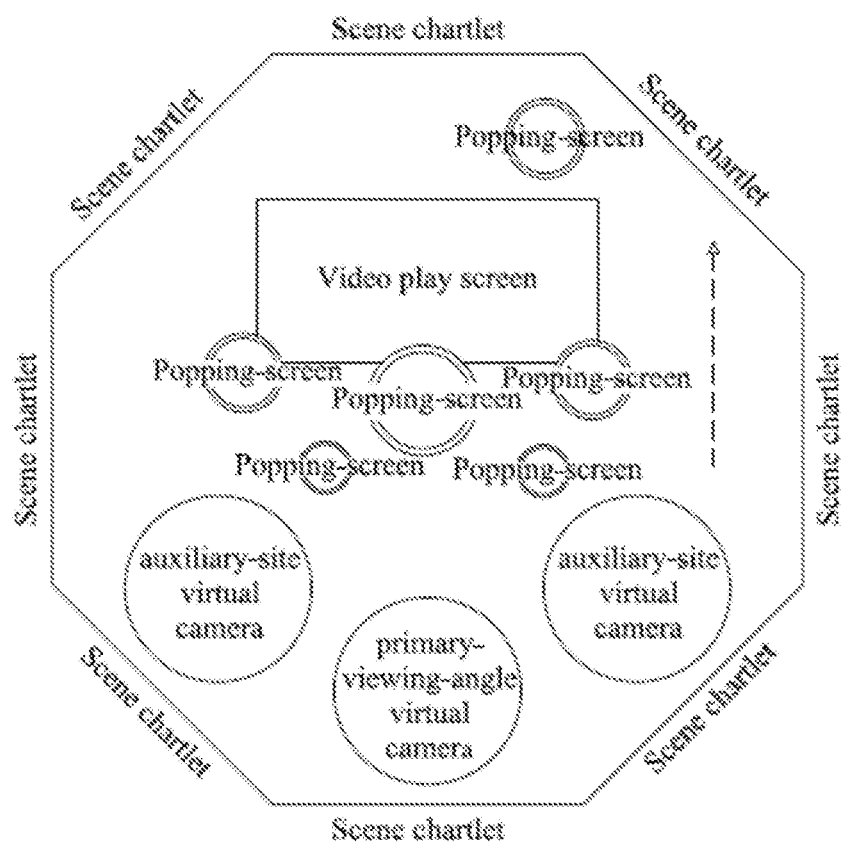
FIG. 4 is a diagram showing the effect according to a second embodiment of the present invention.
Figure 5:
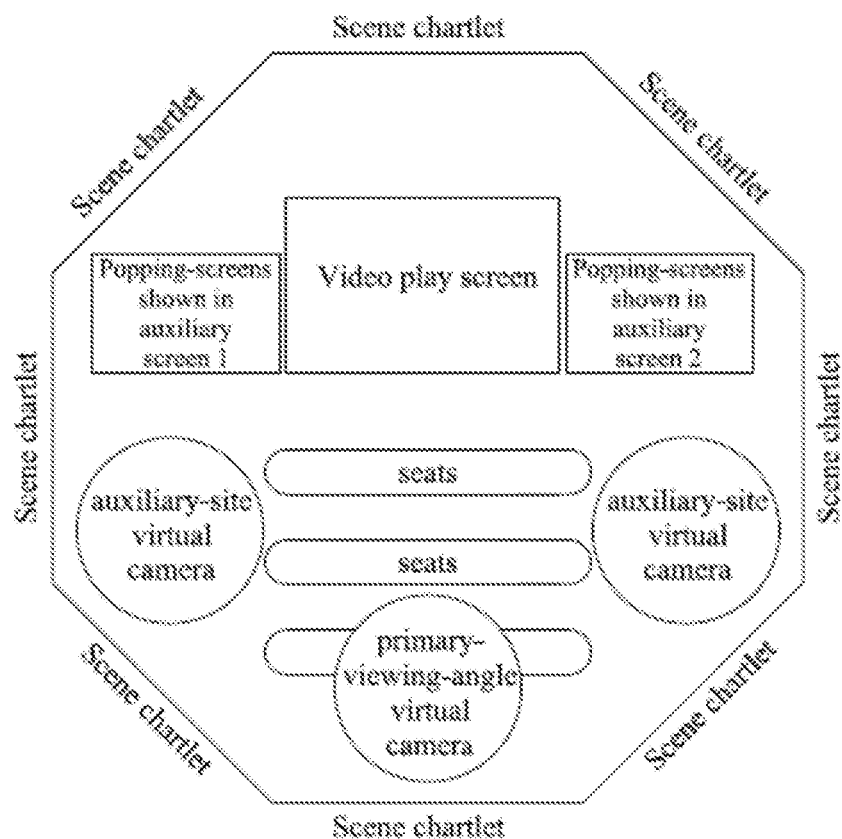
FIG. 5 is a diagram showing the effect according to a third embodiment of the present invention.

Some specific applications are shown in FIGS. 3 to 5. FIG. 3 shows a popping-screen appearing in a moon environment. The popping-screen is presented to the user to be flying along a surrounding track behind the video play screen. As shown in FIG. 4, a popping-screen displayed as having a submarine environment is created. The popping-screens float up in the form of bubbles in front of the video screen. As shown in FIG. 5, user is supported to be in a theater environment, and the popping-screen is displayed with a rolling in auxiliary screens located at both sides of the video play screen.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 6:
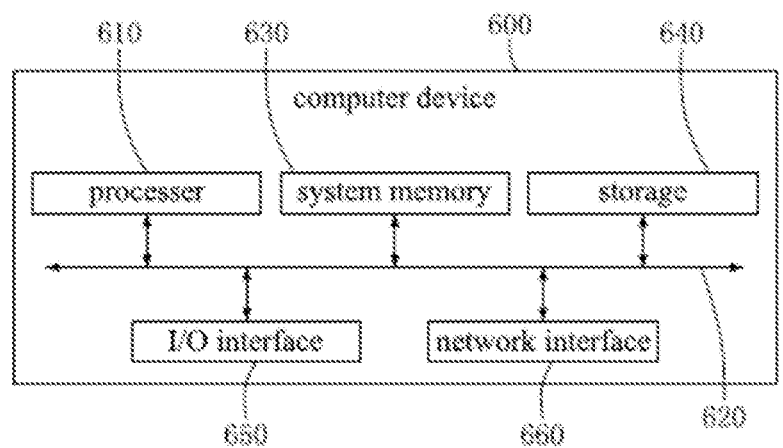
FIG. 6 is a diagram illustrating an example computing system that may be used in some embodiments.

In at least some embodiments, a server or computing device that implements a portion or all of one or more of the technologies described herein, including the techniques to implement the functionality of the server 100, the client terminal 200, may include a general-purpose computer system that includes or is configured to access one or more computer-accessible media. FIG. 6 illustrates such a general-purpose computing device 600. In the illustrated embodiment, computing device 200 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of displaying popping-screen comment information in a virtual reality environment, comprising:
    retrieving popping-screen comment information associated with a video in response to a request for displaying the popping-screen comment information while playing the video;
    acquiring a first corresponding type of 3D spatial scene template in response to a request for a first display type;
    integrating the popping-screen comment information into the first corresponding type of 3D spatial scene template and the video;
    outputting the popping-screen comment information in combination with the first corresponding type of 3D spatial scene template and the video; and
    generating and storing a plurality of types of 3D spatial scene templates, wherein the generating a plurality of types of 3D spatial scene templates further comprises:
        obtaining a 3D spatial scene model using 3D rendering,
        obtaining a scene chartlet by charting a 3D material texture into the scene model,
        arranging the scene chartlet according to a spatial layout of the scene model,
        setting light source data of a scene environment corresponding to the scene model according to a time list of the scene model, and
        creating a primary-view-angle virtual camera and a plurality of auxiliary-site virtual cameras and determining coordinate positions of the primary-view-angle virtual camera and the plurality of auxiliary-site virtual cameras in the scene model according to a position of the scene chartlet and a position where the popping-screen comment information is displayed.

2. The method of claim 1, wherein the scene model comprises a scene object and a scene entity.

3. The method of claim 1, wherein the time list of the scene model comprises an appearing timing and an ending timing of the scene object or the scene entity in the video.

4. The method of claim 1, wherein the light source data of the scene environment include position coordinate, color, intensity and direction of the light source.

5. A method of claim 1, further comprising:
switching to a second corresponding type of 3D spatial scene template in response to a request for a second display type.

6. The method of claim 1, further comprising:
receiving, by a client computing device, an acquired corresponding type of 3D spatial scene template;
receiving, by the client computing device, retrieved popping-screen comment information; and
displaying, by the client computing device, the popping-screen information in a virtual reality environment by combining the popping-screen information with a picture captured by a primary-viewing-angle virtual camera, a plurality of pictures captured by a plurality of auxiliary-site virtual cameras, and a scene chartlet.

7. A computing system of displaying popping-screen comment information in a virtual reality environment, comprising:
at least one processor; and
at least one memory communicatively coupled to the at least one processor and storing instructions that upon execution by the at least one processor cause the computing system to:
retrieve popping-screen comment information associated with a video in response to a request for displaying the popping-screen comment information while playing the video;
acquire a first corresponding type of 3D spatial scene template in response to a request for a first display type;
integrate the popping-screen comment information into the first corresponding type of 3D spatial scene template and the video;
output the popping-screen comment information in combination with the first corresponding type of 3D spatial scene template and the video; and
generate and store a plurality of different types of 3D spatial scene templates, wherein the at least one memory further stores instructions that upon execution by the at least one processor cause the computing system to:
obtain a 3D spatial scene model using 3D rendering,
obtain a scene chartlet by charting a 3D material texture into the scene model,
arrange the scene chartlet according to a spatial layout of the scene model,
set light source data of a scene environment corresponding to the scene model according to a time list of the scene model, and
create a primary-view-angle virtual camera and a plurality of auxiliary-site virtual cameras and determine coordinate positions of the primary-view-angle virtual camera and the plurality of auxiliary-site virtual cameras in the scene model according to a position of the scene chartlet and a position where the popping-screen comment information is displayed.

8. The computing system of claim 7, wherein the scene model comprises a scene object and a scene entity.

9. The computing system of claim 7, wherein the time list of the scene model comprises an appearing timing and an ending timing of the scene object or the scene entity in the video.

10. The computing system of claim 7, wherein the light source data of the scene environment include position coordinate, color, intensity and direction of the light source.

11. The computing system of claim 7, the at least one memory further storing instructions that upon execution by the at least one processor cause the computing system to:
switch to a second corresponding type of 3D spatial scene template in response to a request for a second display type.

12. A non-transitory computer-readable storage medium comprising computer-readable instructions that upon execution on a computing device cause the computing device at least to:
generate a first type of 3D spatial scene template, wherein the computer-readable instructions that upon execution cause the computing device to generate a first type of 3D spatial scene template further comprise computer-readable instructions that upon execution on the computing device cause the computing system to:
obtain a 3D spatial scene model using 3D rendering,
obtain a scene chartlet by charting a 3D material texture into the scene model,
arrange the scene chartlet according to a spatial layout of the scene model,
set light source data of a scene environment corresponding to the scene model according to a time list of the scene model, and
create a primary-view-angle virtual camera and a plurality of auxiliary-site virtual cameras and determine coordinate positions of the primary-view-angle virtual camera and the plurality of auxiliary-site virtual cameras in the scene model according to a position of the scene chartlet and a position where the popping-screen comment information is displayed;
retrieve comment information associated with a video in response to a request for displaying the comment information while playing the video;
acquire the first type of 3D spatial scene template in response to a request for a first display type;
integrate the comment information into the first type of 3D spatial scene template and the video;
output the comment information in combination with the first type of 3D spatial scene template and the video.

13. The non-transitory computer-readable storage medium of claim 12, wherein the time list of the scene model comprises an appearing timing and an ending timing of a scene object or a scene entity in the video.

14. The non-transitory computer-readable storage medium of claim 12, wherein the light source data of the scene environment include position coordinate, color, intensity and direction of the light source.

15. The non-transitory computer-readable storage medium of claim 12, further comprising computer-readable instructions that upon execution on the computing device cause the computing device at least to:
generate a second type of 3D spatial scene templates; and
store the second type of 3D spatial scene templates.

16. The non-transitory computer-readable storage medium of claim 15, further comprising computer-readable instructions that upon execution on the computing device cause the computing device at least to:
switch to the second type of 3D spatial scene template in response to a request for a second display type.

17. The non-transitory computer-readable storage medium of claim 12, further comprising computer-readable instructions that upon execution on the computing device cause the computing device at least to:

combine the comment information with the first type of 3D space scene template and the video based on a timeline of the comment information and information associated with the first type of 3D spatial scene template.

18. The non-transitory computer-readable storage medium of claim 17, wherein the information associated with the first type of 3D spatial scene template comprises information indicative of displaying the comment information behind a virtual video play screen.

19. The non-transitory computer-readable storage medium of claim 17, wherein the information associated with the first type of 3D spatial scene template comprises information indicative of displaying the comment information in front of a virtual video play screen.

20. The non-transitory computer-readable storage medium of claim 17, wherein the information associated with the first type of 3D spatial scene template comprises information indicative of displaying the comment information at either side of a virtual video play screen.

* * * * *